Nov. 24, 1925.

M. C. BLEST 1,563,150

CLASP BRAKE

Filed Jan. 2, 1923

2 Sheets-Sheet 1

WITNESS

INVENTOR
Minot C. Blest.
by
ATTORNEY

Nov. 24, 1925.  
M. C. BLEST  
CLASP BRAKE  
Filed Jan. 2, 1923  
1,563,150  
2 Sheets-Sheet 2

WITNESS  
Kathleen Kleber  
Rephurn E. Anderson

INVENTOR  
Minot C. Blest.  
G. C. Lambe  
ATTORNEY

Patented Nov. 24, 1925.

1,563,150

UNITED STATES PATENT OFFICE.

MINOT C. BLEST, OF BELLEVUE, PENNSYLVANIA, ASSIGNOR TO PRESSED STEEL CAR COMPANY, OF PITTSBURGH, PENNSYLVANIA, A CORPORATION OF NEW JERSEY.

CLASP BRAKE.

Application filed January 2, 1923. Serial No. 610,108.

*To all whom it may concern:*

Be it known that I, MINOT C. BLEST, a citizen of the United States, residing in Bellevue, in the county of Allegheny and State of Pennsylvania, have invented certain new and useful Improvements in Clasp Brakes, of which the following is a specification.

An object of the present invention is to provide a clasp brake for railway cars which is simple and efficient, and comparatively cheap to manufacture.

Another object of the invention is to provide a clasp brake mechanism in which a single set of operating levers and rods are used, which are so positioned that they will not interfere with the truck or car body parts, thus reducing the parts of the mechanism to a minimum.

Figure 1:
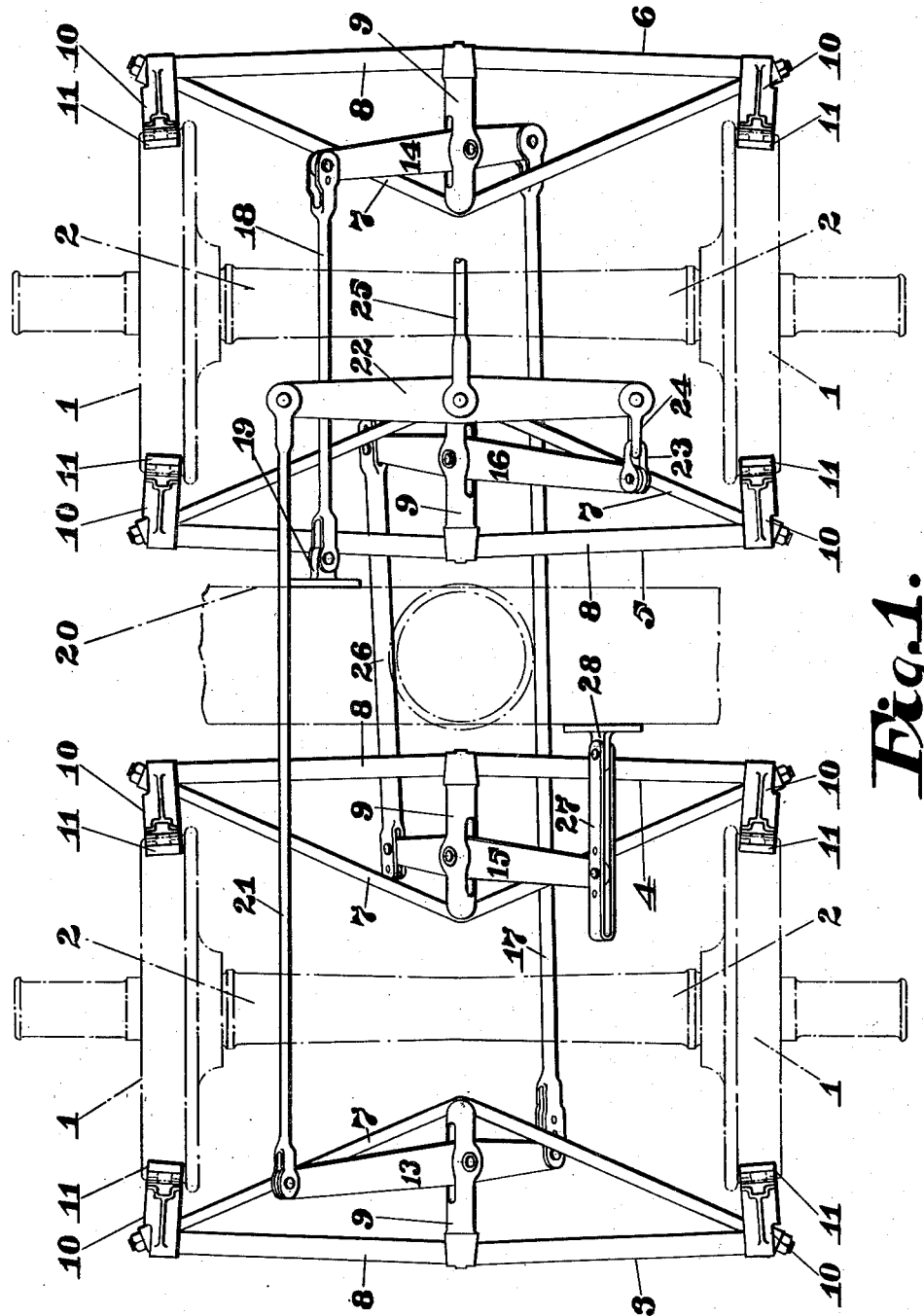
Figure 2:
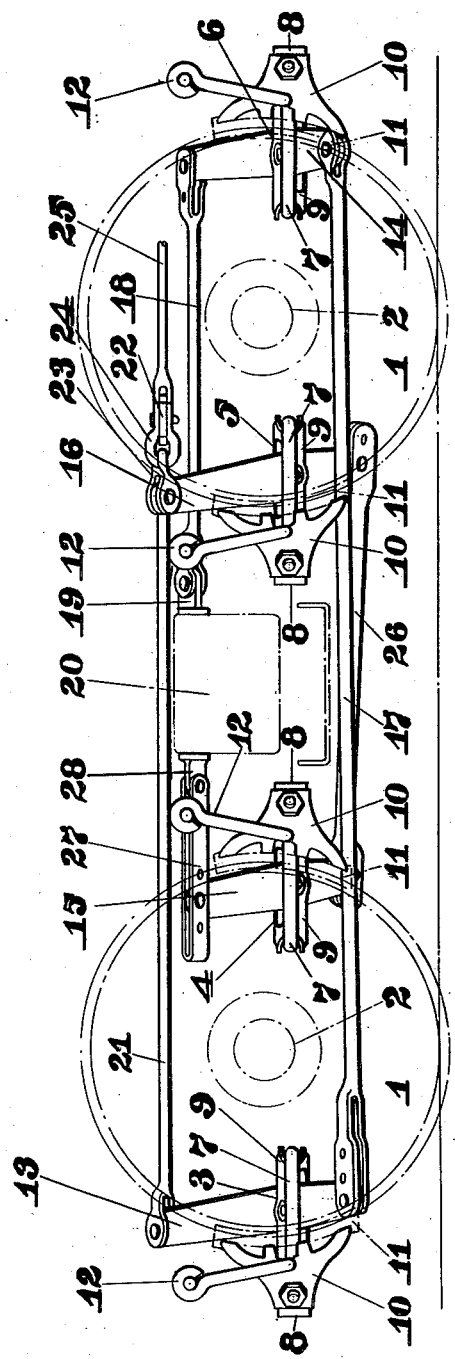
Figure 3:
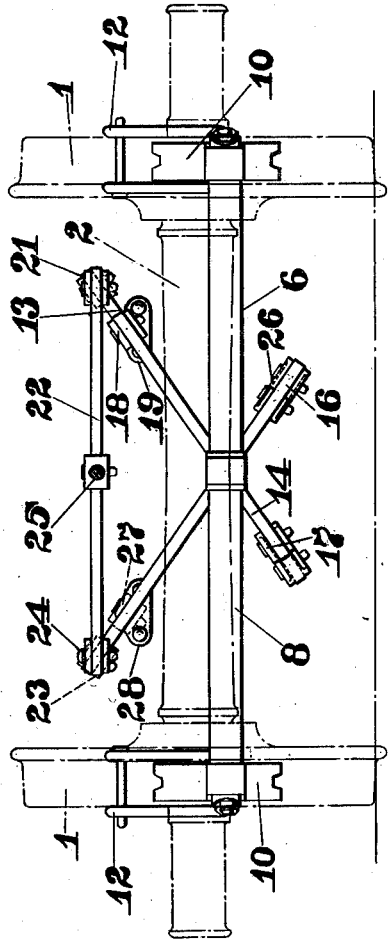

These and other objects will be apparent from the following description:

Referring now to the drawings in which like reference characters refer to like parts. Fig. 1 is a plan view of the brake mechanism; Fig. 2 is a side elevational view of the same, and Figure 3 is an end elevational view of the same.

Referring now in detail to the drawings the reference character 1 indicates the wheels of a car truck mounted on axles 2 which are mounted in the truck frame (not shown) in any preferred manner.

At one side of one pair of wheels a brake beam 3 is provided and at the opposite side a brake beam 4 is provided, while at one side of an adjacent pair of wheels a brake beam 5 is provided, and at the opposite side a brake beam 6 is provided. These beams may be of any suitable construction, but as illustrated in the drawings, each beam preferably comprises a tension member 7, a compression member 8 and a strut 9, all connected together in the usual manner. At the ends of each beam, brake shoe heads 10 are provided, to which the brake shoes 11 are secured and these beams are supported by hangers 12 which are connected with the truck in any preferred manner and to the heads 10. The brake beams 3 and 6 are provided with levers 13 and 14, respectively, which are inclined from the vertical in the same direction, and the beams 4 and 5 are provided with levers 15 and 16 respectively, which are inclined in the same direction relative to each other and in a direction opposite to the levers 13 and 14. Each of these levers intermediate its ends is pivotally connected with the strut 9 of its respective beam. The lower end of the lever 13 is connected with the lower end of the lever 14 through the medium of a rod 17, which is pivotally connected with these levers by pins or other suitable means. The upper end of the lever 14 has pivotally connected therewith, one end of a rod 18, the opposite end being pivotally connected with a bracket or projection 19 on the truck bolster 20. The upper end of the lever 13 has pivotally connected therewith one end of a rod 21, the opposite end of such rod being pivotally connected with one end of a horizontally disposed equalizing lever 22. The opposite end of the lever 22 is connected with the lever 16 through the medium of interengaging links 23 and 24 which are connected with the levers 22 and 16 respectively. Intermediate its ends this lever 22 has attached thereto a pull rod 25. To the lower end of the lever 16 is connected one end of a rod 26, the opposite end of which rod is connected with the lower end of the lever 15. The upper end of the lever 15 is connected with a fulcrum or yoke 27 which is pivotally connected with a bracket or projection 28 on the bolster 20.

It will be noted that by sloping the levers 13 and 16 in a direction opposite to that of levers 14 and 15, only one set of levers and rods are necessary to operate the brake, and at the same time permits of the placing of the various parts of the brake in such positions that they will not interfere with the car and truck parts, more especially with the center plates thereof, thus obviating the use of a number of extra parts, and reducing the number of parts of the mechanism to a minimum.

It will be apparent to those skilled in the art to which this invention appertains, that many changes may be made in the details and arrangement of the several parts forming the invention, without departing from the spirit and scope of the appended claims.

Having thus described the invention, what I claim as new and desire to secure by Letters Patent is:—

1. In a clasp brake mechanism, the combination with a car truck, of a brake lever located adjacent one end of said truck and inclined in one direction, a brake lever located adjacent the opposite end of said truck and inclined in the same direction as the first mentioned lever, said levers being operatively connected, a plurality of connected brake levers inclined in the opposite direction, and means operatively connecting both of said sets of levers.

2. In a clasp brake mechanism, a plurality of connected brake levers inclined in one direction, a plurality of connected brake levers inclined in the opposite direction, and located between the first mentioned levers, and a lever connecting one of the levers of each set.

3. In a clasp brake mechanism, a pair of connected lever inclined in one direction, a pair of connected levers between the levers of the first mentioned pair of levers and inclined in the opposite direction and means operatively connecting both of said pairs of levers.

4. In a clasp brake mechanism, a pair of connected levers inclined in one direction, a connection from one of said levers to a truck member, a pair of connected levers inclined in the opposite direction to the first mentioned pair and located therebetween, a connection from one of the levers of the second mentioned pair of levers to said member and means operatively connecting said pairs of levers.

5. A clasp brake mechanism in combination with a truck having a plurality of pairs of wheels, of brake beams on each side of each pair of wheels, brake levers operatively connected with said beams, the levers connected with the outer beams being inclined in one direction and operatively connected together and the levers connected with the inner beams being inclined in the opposite direction and operatively connected together and means for operating said levers simultaneously.

6. In a clasp brake mechanism, a live lever and a dead lever operatively connected together and inclined in one direction, a second live lever and a second dead lever operatively connected together and located between the first mentioned levers, and a horizontally disposed member operatively connecting said live levers.

7. In a clasp brake mechanism, a live and a dead lever operatively connected together, a second live and dead lever operatively connected together, the last mentioned levers being arranged intermediate the first mentioned levers and an equalizer operatively connected with both of said live levers.

8. In a clasp brake mechanism, the combination with a railway car truck, of a live lever adjacent one end of said truck and a dead lever adjacent the opposite end of said truck, said levers being operatively connected together and inclined in one direction, a second live lever and a second dead lever operatively connected together and inclined in the opposite direction and arranged between the first mentioned levers, said dead levers being fulcrumed to said truck, and means operatively connecting said live levers.

9. In a clasp brake mechanism, the combination with a car truck having a plurality of pairs of wheels, brake beams arranged outside of each pair of wheels, levers connected with said beams and inclined in one direction, means operatively connecting said levers, brake beams arranged between said pairs of wheels, levers connected with said beams and inclined in the opposite direction to the first mentioned levers, means operatively connecting the second mentioned levers, and means operatively connecting one of the first mentioned levers and one of the second mentioned levers.

10. In a clasp brake mechanism, the combination with a car truck having a plurality of pairs of wheels, brake beams arranged outside of each pair of wheels, levers connected with said beams and inclined in one direction, means operatively connecting said levers, brake beams arranged between said pairs of wheels, levers connected with said beams and inclined in the opposite direction to the first mentioned levers, means operatively connecting the second mentioned levers, means operatively connecting one of the first mentioned levers and one of the second mentioned levers, and fulcrum means connected with the other of said levers and said truck.

11. In a clasp brake mechanism for car trucks, two pairs of levers inclined in opposite directions, and operatively connected together, one of said pairs of levers being located intermediate the levers of the other of said pairs.

In testimony whereof I affix my signature.

MINOT C. BLEST.